United States Patent
Tran et al.

(10) Patent No.: US 7,058,070 B2
(45) Date of Patent: Jun. 6, 2006

(54) BACK PRESSURE CONTROL SYSTEM FOR NETWORK SWITCH PORT

(75) Inventors: Toan D. Tran, Sunnyvale, CA (US); Robert J. Divivier, San Jose, CA (US)

(73) Assignee: Integrated Device Technology, Inc., San Jose, CA (US)

(*) Notice: Subject to any disclaimer, the term of this patent is extended or adjusted under 35 U.S.C. 154(b) by 752 days.

(21) Appl. No.: 09/847,079

(22) Filed: May 1, 2001

(65) Prior Publication Data

US 2004/0213251 A1 Oct. 28, 2004

(51) Int. Cl.
*H04L 12/28* (2006.01)
(52) U.S. Cl. ............................. 370/412; 370/419; 370/429
(58) Field of Classification Search ........ 370/229–240, 370/395.7, 395.71, 395.72, 412, 415, 416, 370/419, 428–429, 392; 709/235, 244; 710/29, 710/52–60; 711/143, 153, 171
See application file for complete search history.

(56) References Cited

U.S. PATENT DOCUMENTS

| 5,278,828 | A | * | 1/1994 | Chao ......................... 370/394 |
| 5,313,582 | A | * | 5/1994 | Hendel et al. ................. 710/56 |
| 5,689,500 | A | * | 11/1997 | Chiussi et al. ............. 370/235 |
| 5,799,014 | A | * | 8/1998 | Kozaki et al. ............. 370/358 |
| 5,822,316 | A | * | 10/1998 | Unekawa ..................... 370/389 |
| 5,859,837 | A | * | 1/1999 | Crayford .................... 370/230 |
| 5,859,849 | A | * | 1/1999 | Parks ..................... 370/395.72 |
| 5,923,656 | A | * | 7/1999 | Duan et al. ............. 370/395.4 |
| 5,978,359 | A | * | 11/1999 | Caldara et al. ............. 370/236 |
| 6,144,635 | A | * | 11/2000 | Nakagawa ................. 370/229 |
| 6,324,165 | B1 | * | 11/2001 | Fan et al. .................... 370/232 |
| 6,388,993 | B1 | * | 5/2002 | Shin et al. .................. 370/233 |
| 6,457,081 | B1 | * | 9/2002 | Gulick ........................ 710/305 |
| 6,487,202 | B1 | * | 11/2002 | Klausmeier et al. ..... 370/395.1 |
| 6,560,654 | B1 | * | 5/2003 | Fedyk et al. ................ 709/239 |
| 6,590,901 | B1 | * | 7/2003 | Jones ......................... 370/428 |
| 6,725,270 | B1 | * | 4/2004 | Yu et al. ..................... 709/229 |
| 6,735,203 | B1 | * | 5/2004 | Heiman ...................... 370/394 |
| 2001/0014100 | A1 | * | 8/2001 | Abe et al. ................... 370/412 |

* cited by examiner

*Primary Examiner*—Chau Nguyen
*Assistant Examiner*—Ian N. Moore
(74) *Attorney, Agent, or Firm*—Smith-Hill & Bedell (57) ABSTRACT

A network switch port includes a cell memory, a queuing system, a data path controller and an output buffer. The data path controller stores incoming cells derived from network data transmissions in the cell memory. The queuing system generates the cell memory address of each stored cell when the cell is to be forwarded from the cell memory, and the data path controller appends the cell memory address of that cell to a linked list of addresses of cells to be forwarded from the memory. When the linked list is not empty, the data path controller forwards cells from the cell memory to the output buffer in the order that their cell memory addresses were appended to the linked list. The output buffer stores and then sequentially forwards the cells outward from the switch port to a receiving network component which store them in a cell buffer until it can forward them elsewhere. The receiving network component produces a multiple bit back pressure data indicating how much of its cell buffer is currently filled with cells. Depending on the fill amount the back pressure data indicates, the output buffer either halts or continues to forward cells to the receiving network component, and either halts or continues allowing the data path controller to forward cells from the cell memory to the output buffer.

13 Claims, 3 Drawing Sheets

BACK PRESSURE CONTROL SYSTEM FOR NETWORK SWITCH PORT

BACKGROUND OF THE INVENTION

1. Field of the Invention

The present invention relates to a network port for receiving, storing, and then forwarding cells derived from network data transmissions, and in particular to a system for adjusting rates at which the port forwards the cells in response to back pressure.

2. Description of Related Art

A typical network switch for routing data transmissions (packets) between network buses includes a set of input ports, a set of output ports, and a switch fabric providing data signal paths between the input and output ports. Each input port includes a memory for storing each incoming packet until the input port can forward it via the switch to an output port. Each output port also includes a memory for each packet arriving via the switch fabric until it can forward the packet outward on a network bus.

Although packets may be of variable size, a switch port may organize its memory into a set of memory blocks of uniform size, each sufficiently large to hold the largest possible packet. However when most packets are much smaller than the maximum allowable size, much of the storage capacity of most memory blocks is wasted. To make more efficient use of memory space, an input port may convert each incoming packet into a sequence of relatively small cells of uniform size. A traffic manager within the input port stores each cell derived from a packet in a separate memory block sized just large enough to hold one cell. Although breaking each packet into a sequence of uniform sized cells increases the port's packet processing overhead, since the port has to keep track where cells of each packet are stored, the port makes more efficient use of the data storage capacity of the port's cell memory because most memory blocks are completely filled with packet data.

Some time after storing the cells derived from an incoming packet in a cell memory, a typical input port's traffic manager reads the cells out of the cell memory in appropriate order and places them in a "first-in, first-out" (FIFO) buffer. When the FIFO buffer is not empty, a switch interface circuit requests a path through the switch fabric to an output port that is to receive the longest-stored ("head of line") cell in the FIFO buffer, forwards the cell to the output port when the path is available and then shifts the cell out of the FIFO buffer. The output port's traffic manager stores the cell in the output port's cell memory and thereafter reads the cell out of that cell memory and forwards it to another FIFO buffer. The output port's protocol processor reassembles cells stored in that FIFO buffer into packets, and forwards the packets outward on a network bus.

Some network systems assign each packet to one of several "flows"; all packets assigned to the same flow arrive at the same switch input port and depart from the same switch output port. Each flow has an associated "class of service" which may A specify an average minimum and/or maximum rate at which cells assigned to the flow must be forwarded, or which may specify an average fixed rate at which cell of the flow must be forwarded. Even though a port may at times have the bandwidth available to forward cells of various flows at higher rates, the port's traffic manager tries to control the rate at which it forwards cells from the port's cell memory of each flow so that it remains within the range specified by that flow's class of service.

An input or output port's FIFO buffers are needed to temporarily store cells read out of the cell memory until they can be forwarded since a times a port may be unable to forward cells as fast as the traffic manager sends them out of the cell memory. For example, in an input port this can happen when an output port to which cells are destined is busy receiving cells from other ports. The FIFO buffer typically sends a "back pressure" signal to the traffic manager when its internal cell buffer is filled to tell the traffic manager to stop sending cells. In some systems, the back pressure signal conveys a code indicating how much of the capacity of FIFO buffer is currently unused. For example when such a back pressure signal indicates the FIFO buffer fill has reached a threshold level below the maximum capacity, the traffic manager may stop sending cells of lower priority flows out of the cell memory to the FIFO buffer while continuing to send cells of higher priority cells to the FIFO buffer until it is full.

When a switch interface circuit queues all incoming cells in a FIFO buffer, a head-of-line cell in the FIFO buffer destined for an output port that is busy will prevent the port from forwarding cells to output ports that are not busy. To prevent such "head-of-line" blocking, a port may holding cells read out of the cell memory that destined for separate output port in separate FIFO buffers so one busy output port will not block flow of cells to other output ports. In such case each FIFO buffer can send a separate back pressure signal back to the traffic manager and the traffic manager need only halt forwarding of only those flows destined to output ports that are blocked.

While a traffic manger tries to maintain an average forwarding rate for cells of each flow, a halt forwarding of cells of a flow due to back pressure that is long enough to cause a FIFO buffer to fill up, will require the traffic manager to shut off the flow of cells of one or more flows passing from the cell memory to the FIFO buffer. Such a halt in forwarding of cells to the FIFO buffer will adversely impact the average cell rate of one or more flows. The amount of time that a FIFO buffer can be blocked without requiring the traffic manager to reduce the rate at which it forwards cells into the FIFO buffer increases with the capacity of the FIFO buffer. Hence by increasing the size of the FIFO buffer we improve the system's ability to maintain average cell forwarding rates despite prolonged forwarding halts due to back pressure.

But FIFO buffers capable of holding large numbers of cells are expensive. What is needed is a system that permits the traffic manager to maintain desired average cell forwarding rates for each flow despite relatively long halts in cell forwarding from the switch interface circuit due to back pressure without having to employ large FIFO buffers.

BRIEF SUMMARY OF THE INVENTION

A network switch in accordance with the invention includes a set of input ports, each for receiving incoming packets, for converting them into sequences of cells, and for temporarily storing the cells in a cell memory. A switch fabric forwards cell sequences from each input port to selected output ports. Each output port stores each cell sequence in its own cell memory, and then later reassembles each cell sequence back into packet and forwards it outward from the network switch.

Each cell is stored in a separate memory block of the input and output ports' cell memories, and each memory block has a separate address ("BLOCK_ID"). Each packet is assigned to one of a set of flows, each flow having an allocated average minimum and maximum rate at which cells derived from packets of that flow are to be forwarded from the input port. In an input port all cells of each flow are directed to the same switch output port, and all flows directed to the same output port are assigned to the same "virtual output queue" (VOQ). More than one flow may be assigned to the same VOQ when they are directed to the same output port. In an output port, a flow's VOQ may correspond, for example, to a particular network bus or a particular channel within a network bus, on which packets assigned to that flow are to be forwarded from the network switch.

Each input or output port includes a traffic manager that writes incoming cells into the cell memory and determines an order and an average rate at which cells of each flow are to be forwarded from the switch port. The traffic manager maintains a set BLOCK_ID queues, one for each VOQ, and when it determines that a cell is to be read out of the cell memory, it places the cell's BLOCK_ID in the BLOCK_ID queue associated with the VOQ to which the cell's flow is assigned. When the BLOCK_ID queue for a given VOQ is not empty the traffic manger reads cells of that VOQ out of the cell memory at a high rate in an order in which their BLOCK_IDs were stored in the BLOCK_ID queue. As the traffic manger reads cells out of the cell memory, it stores them in first-in, first out (FIFO) buffers until they can be forwarded outward from the port. While the instantaneous cell forwarding rates of the various flows are determined by the rates at which the cells of those flows are forwarded from the FIFO buffers, the time-average cell forwarding rates of the flows are determined by the rate at which the traffic manager places BLOCK_IDs of cells assigned to the flows in the BLOCK_ID queues.

When back pressure renders the FIFO buffers temporarily unable to forward cells assigned to one or more VOQs, and the FIFO buffers start to fill up, the traffic manager stops reading cells assigning to those VOQs out of the cell memory. However it does not stop adding BLOCK_ID of cells into the BLOCK_ID queues at the average rate at which cells of those VOWs are to be forwarded from the switch port. When the FIFO buffers subsequently are able to receive more cells, the traffic manager resumes forwarding cells out of the cell memory at a relatively high rate in the order their BLOCK_IDs were stored in the BLOCK_ID queues.

The traffic manager slows or halts sending BLOCK_IDs into the BLOCK_ID associated with a VOQ only when the number of BLOCK_IDs stored in the BLOCK_ID queue associated with that VOQ reaches predetermined thresholds. When the capacity of the BLOCK_ID queue associated with each VOQ is large enough to hold the BLOCK_ID of every cell of that VOQ that may be stored in the cell memory, the traffic manger can maintain each flow's average forwarding rate of despite temporary halts in actual cell forwarding that may last for relatively long periods of time.

By using BLOCK_ID queues maintained in a relatively small, inexpensive memory to queue BLOCK_IDs instead of cells, a switch port having only relatively small cell buffers can provide the same level of back pressure flow regulation as a prior art switch port relying on relatively large FIFO buffers.

It is accordingly an object of the invention to provide a network switch port that can maintain desired average cell forwarding rates for each flow despite relatively long halts in cell forwarding from the switch interface circuit due to back pressure without having to employ large FIFO buffers.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DETAILED DESCRIPTION OF THE INVENTION

Network Switch

Figure 1:
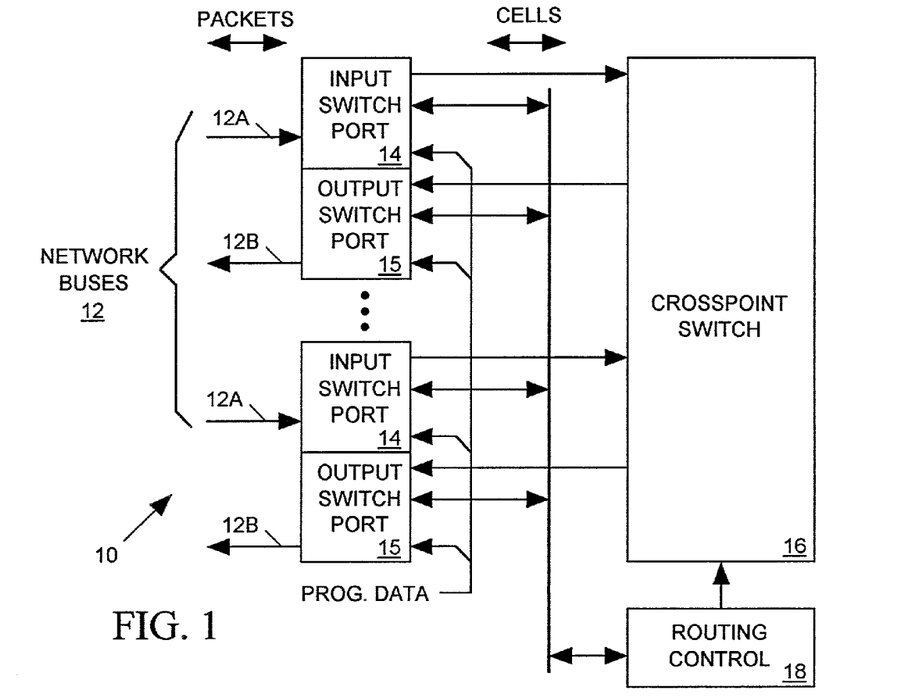
FIG. 1 illustrates a network switch 10 in accordance with the invention for routing network packets between network buses.

FIG. 1 illustrates a network switch 10 in accordance with the invention for routing network transmissions (packets) between a set of network buses 12. Network switch 10 includes a set of input ports 14, a set of output ports 15, a switch fabric such as a crosspoint switch 16, and a routing control circuit 18. Each input port 14 receives incoming packets arriving on a separate input bus 12A and each output port 15 forwards outgoing packets on a separate output bus 12B. Although not shown in FIG. 1, each input port 14 may receive packets on more than one incoming bus 12A and each output port may forward outgoing packets on more than one outgoing bus 12B. Crosspoint switch 16 selectively provides signal paths between input ports 14 and output ports 15 in response to control data from routing control circuit 18 based on routing requests from input ports 14.

Incoming packets arriving on buses 12A are network data transmissions that may be of any of a variety of formats such as, for example, variable length Ethernet packets. Buses 12A and 12B may or may not be time division multiplexed. Each input port 14 converts each incoming packet to a sequence of one or more "cells" of uniform size and format, and stores each cell in an internal cell memory. Based on information included in each packet arriving on one of buses 12A, the input port 14 that received the packet determines which output port 15 must forward the packet outward on one of outgoing buses 12B toward its intended destination. The receiving input port 14 then requests routing control circuit 18 to establish a signal path through crosspoint switch 16 to the appropriate output port 15. When routing control circuit 18 grants the request, the receiving input port 14 sequentially forwards all of the cells of the packet to the forwarding output port 15 via crosspoint switch 16. That output input port 15 stores the cells in its own cell memory as they arrive. After receiving all of the cells derived from the incoming packet, the output port 15 reassembles the packet from those cells and forwards the packet outward on one of outgoing network buses 12B.

Input Port

Figure 2A:
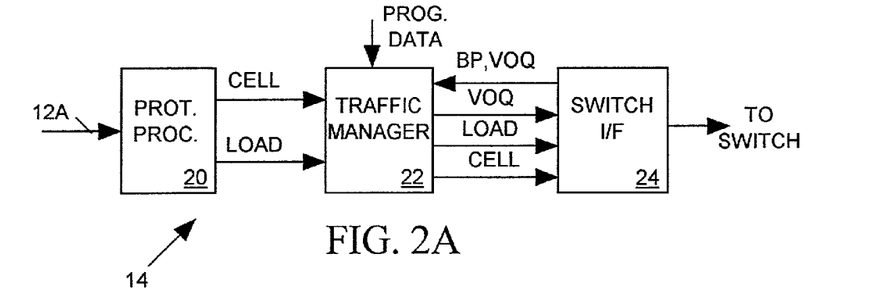
FIG. 2A illustrates one input port of FIG. 1 in more detailed block diagram form.

FIG. 2A illustrates one input port 14 of FIG. 1 in more detailed block diagram form. Switch port 14 includes a protocol processor 20 for converting packets arriving on bus 12A into cell sequences. As protocol processor 20 produces each cell, it pulses a LOAD signal input to a traffic manager 22 to indicate when a next cell is available. Traffic manager 22 temporarily stores the cells derived from each received packet in an internal cell memory and determines from data included in the packet which output port 15 is to forward the packet outward from network switch 10. Thereafter traffic manager 22 sequentially sends the cells of the packet to a switch interface circuit 24. Traffic manager 22 pulses a LOAD signal to tell switch interface circuit 24 when each cell is available. Traffic manager 22 also sends a "virtual output queue" code (VOQ) to switch interface circuit 24 with each cell. The VOQ code identifies the particular the output port 15 to receive the cell. Switch interface circuit 24 includes a separate first-in, first-out (FIFO) buffer for each output port 15 and it stores each cell arriving from traffic manager 22 in the FIFO buffer identified by the VOQ code accompanying the cell.

When any of its VOQ cell buffers currently stores a cell to be forwarded, switch interface circuit 24 requests routing control circuit 18 for a signal path to the associated output port 15 through crosspoint switch 16 of FIG. 1, and then forwards the cell from its corresponding VOQ FIFO buffer to that output port when the routing circuit makes the requested signal path available.

Output Port

Figure 2B:
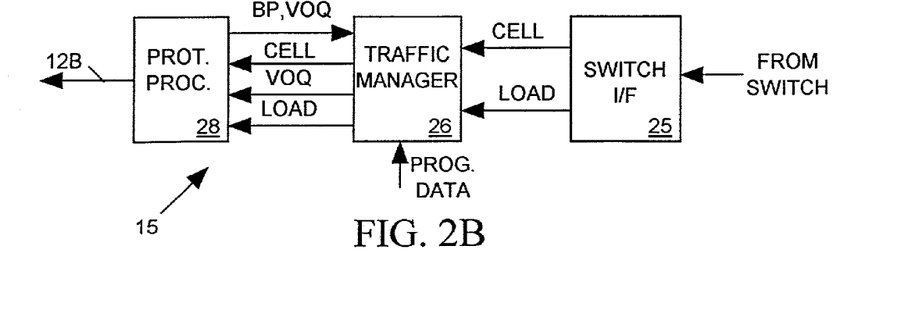
FIG. 2B illustrates one output port of FIG. 1 in more detailed block diagram form.

FIG. 2B illustrates one output port 15 of FIG. 1 in more detailed block diagram form. When its switch interface circuit 25 receives a cell from crosspoint switch 16 it forwards it to a traffic manager 26, pulsing a LOAD signal input to indicate when the cell is available. Traffic manager 26 stores the cell in its internal cell memory. After receiving the last cell of a sequence derived from an incoming packet, traffic manager 26 forwards the cell sequence to a protocol processor 28, pulsing a LOAD signal to shift each cell into the protocol processor. Traffic manager 26 also supplies protocol processor 28 with a VOQ code for each cell. When protocol processor 28 may send packets out on any one of several buses 12B, the VOQ code may be used to identify the particular bus 12B that is to forward the packet from which the cell was derived. Some buses 12A and 12B may convey time domain multiplexed (TDM) traffic in which packets are interleaved in time. For those buses, the VOQ code traffic manager 26 supplies to protocol processor 28 may be used to identify a particular TDM channel of a bus 12B through which the packet is to be forwarded. Protocol processor 28 include an internal cell buffer for storing cells assigned to each VOQ in the corresponding as they arrive. Protocol processor 28 reassembles packets assigned to each VOQ and forwards them outward on a network bus 12B.

Back Pressure

When the output port 15 is busy receiving cells from other input ports, an input port's switch interface circuit 24 (FIG. 2A) may be temporarily blocked from forwarding cells 22 to that output port as fast as it receives them from traffic manager 22. In such case the VOQ FIFO buffer within switch interface circuit 24 that stores cells destined for that output port 15 can begin to fill up. As described in detail below, switch interface circuit 24 periodically provides traffic manager 22 with a back pressure signal BP conveying a separate two-bit code for each of its VOQ FIFO buffers. Switch interface 24 also sends the VOQ number identifying the FIFO buffer whenever it sends a BP code to traffic manager 22. The BP code represents the spare cell storage capacity of the VOQ FIFO buffer. A BP code value of 00 (binary) indicates the forwarding buffer has is full and has 0% spare capacity. A BP data value of 01 indicates that a VOQ FIFO buffer has more than 0% but less than 25% spare cell storage capacity. A BP data value of 10 indicates that the FIFO buffer has at least 25% but less than 50% unused storage capacity. A BP data value of 11 indicates that is least 50% of the FIFO buffer storage capacity is currently unoccupied.

As described in detail below, the back pressure codes BP help traffic manager 22 to regulate the flow of cells to switch interface circuit 24 so that its FIFO buffers do not overflow. Protocol processor 28 provides traffic manager 26 of FIG. 2B with a similar back pressure signal BP conveying back pressure codes indicating the amount of unused capacity of each of its internal VOQ forwarding buffers and these back pressure codes help to regulate the rate at which cells flow into protocol processor 28 during periods when it is unable to forward packets fast enough to prevent its VOQ forwarding buffers from overflowing.

Traffic Manager

Figure 3:
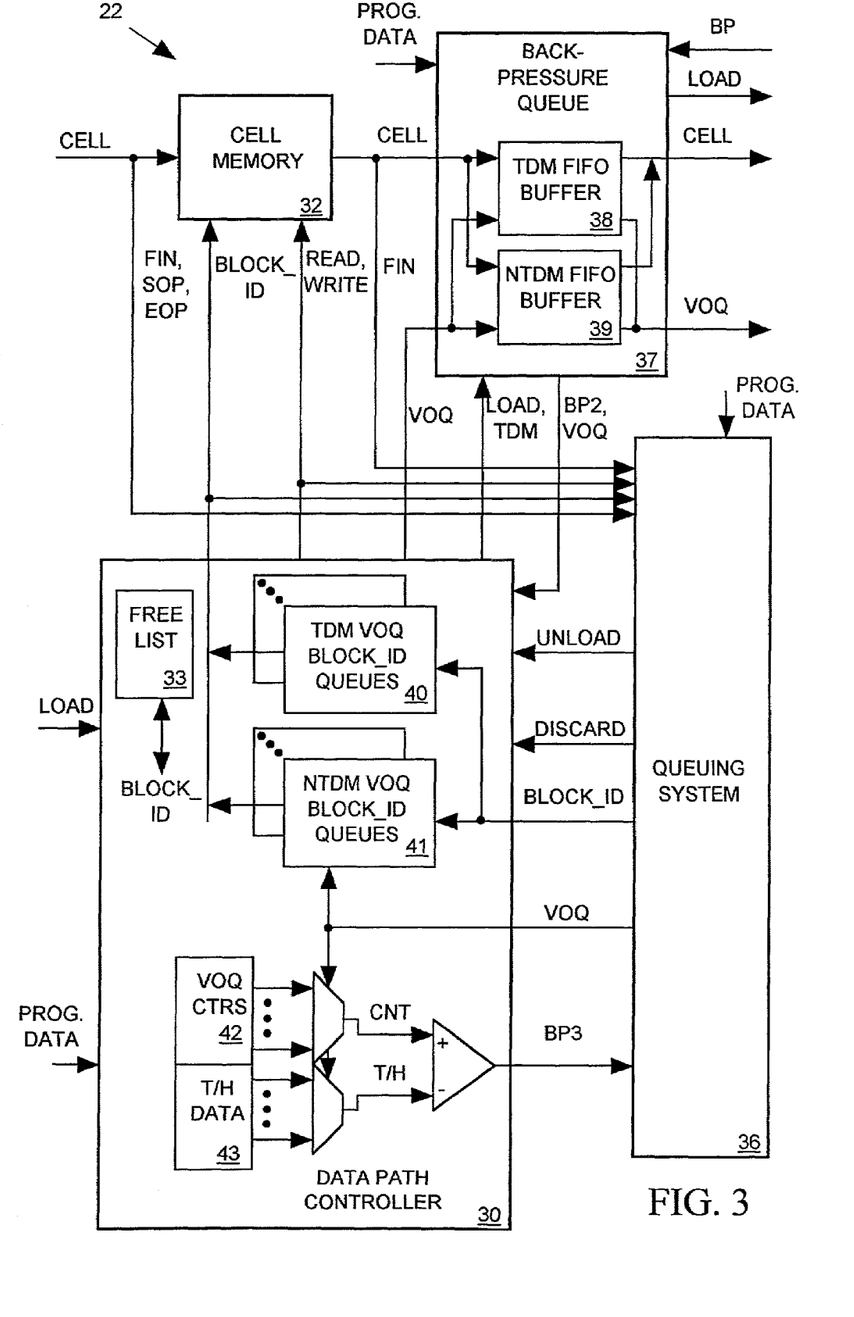
FIG. 3 illustrates a traffic manager of FIG. 2A in more detailed block diagram form.

FIG. 3 illustrates the input port's traffic manager 22 of FIG. 2A in more detailed block diagram form. The output port's traffic manager 26 of FIG. 2B is generally similar in design and operation. Traffic manager 22 includes a data path controller circuit 30 for responding to the LOAD signal from protocol processor 20 (FIG. 2A) by writing an incoming cell into a block of storage locations within a cell memory 32. A BLOCK_ID supplied by data path controller 30 identifies the starting address of the storage block to receive the cell. Data path controller 30 maintains in memory a linked list 33 of BLOCK_IDs of all storage blocks within cell memory 32 not currently storing a cell. When a incoming cell is to be stored in cell memory 32, data path controller pops the BLOCK_ID of a spare storage block from free list 33 and stores the cell at the memory block identified by that BLOCK_ID. Later, when the cell is read out of cell memory, it pushes the BLOCK_ID of the storage block that held the cell back onto free list 33.

Each cell arriving at traffic manager 22 includes a "Flow Identification Number" (FIN) identifying one of a set of "flows" to which its packet has been assigned. Each flow is assigned to a particular class of service defining, for example, an average maximum and/or minimum rate and priority with the network switch is to forward packets assigned to the flow. The FIN also determines which output port 15 (FIG. 1) is to forward the packet outward from the network switch. When protocol processor 20 converts an incoming packet into a sequence of one or more cells, it includes the packet's FIN in a header of each cell along with a start of packet bit (SOP) and end of packet bit (EOP) indicating whether the cell is the first and/or last cell of the sequence of cells derived from a packet.

As it stores a cell in cell memory 32, data path controller 30 passes the cell's FIN, SOP bit and EOP bit, along with the BLOCK_ID of cell's storage location to a queuing system 36 and then pulses a WRITE signal to load the cell into cell memory 32. The WRITE signal also tells the queuing system when a cell has been stored in cell memory 32. Queuing system 36 uses the FIN, SOP, EOP and BLOCK_ID data to keep track of where the cells of each packet are stored in cell memory 32. Queuing system 36 determines when data path controller 30 is to forward each cell out of cell memory 32. Programming data supplied as input to queuing system 36 tells it how to determine forwarding priority and forwarding rates for the various flows.

Queuing system 36 initially determines whether each arriving cell includes a valid FIN. When the FIN of an incoming cell is not valid, queuing system 36 returns a DISCARD signal in response to the LOG signal telling data path controller 30 discard the cell by marking its memory block as unoccupied so that it may be written over with another incoming cell. Programming data input to queuing system 36 also dynamically allocates space in cell memory 32 to each of the various flows. Queuing system 36 keeps track of the number of cells in cell memory 32 that are assigned to each flow, and may also signal data path controller 30 to discard some or all of arriving cells assigned to a particular flow when the number of cells of a particular class stored in cell memory 32 approaches limits defined by the input programming data.

When queuing system 36 decides it is time for data path controller 30 to forward a particular cell out of cell memory 32, it sends the cell's BLOCK_ID and the VOQ code associated with the cell's destination output port 15 (FIG. 1) to data path controller 30 and then pulses an UNLOAD signal to tell data path controller 32 to read the cell stored in memory 32 at that BLOCK_ID and to forward it to a back pressure queue 37. Back pressure queue 37 stores the cell in one of a pair of first-in, first out (FIFO) buffers 38 and 39, and thereafter forwards the cell from the FIFO buffer to switch interface circuit 24 of FIG. 2.

Data path controller 30 maintains a set of internal queues 40 and 41 for storing BLOCK_IDs generated by queuing system 36 until it can signal cell memory 32 to read out cells identified by those BLOCK_IDs. BLOCK_ID queues 40 and 41 are suitably implemented in the form of linked lists in a random access memory having sufficient space to store the BLOCK_ID of every memory block of cell memory 32. Each BLOCK_ID queue 40 corresponds to a separate output port 15 that handles TDM traffic and each BLOCK_ID queue 41 corresponds to a separate output port that handles non-TDM (NTDM) traffic. Thus each queue 40 and 41 also corresponds to a separate VOQ code.

When queuing system 36 generates the BLOCK_ID of a cell to be forwarded from cell memory 32, along with the VOQ code identifying the cell's destination output port, and then pulses the UNLOAD signal, data path controller 30 enters the BLOCK_ID supplied by queuing system 36 into the BLOCK_ID queue 40 or 41 identified by the VOQ code accompanying the BLOCK_ID. When any of its internal VOQ BLOCK_ID queues 40 or 41 are not empty, data path controller 30 forwards BLOCK_IDs contained in that queue to cell memory 32 in the order they entered the queue so that the cell memory will read out the cells they store in that order. Data path controller 30 gives higher priority to forwarding BLOCK_IDs from the TDM queues 40. Whenever a cell is read out of cell memory 32, data path controller 30 pushes the BLOCK_ID of that cell back onto free list 33. Since data path controller 30 can usually forward BLOCK_IDs out of its internal queues faster than queuing system 36 signals it to push BLOCK_IDs into the queues, each VOQ BLOCK_ID queue 40 and 41 usually contains no more than one BLOCK_ID at a time, except under back pressure conditions as described below. Hence data path controller 30 usually reads each cell out of cell memory 32 and forwards it to back pressure queue 37 shortly after queuing system 36 tells it to do so.

When data path controller 30 sends a BLOCK_ID from one of its internal queues to cell memory 32 it pulses a READ signal causing the cell memory 32 to read out the cell identified by that BLOCK_ID to back pressure queue 37. The cell memory block then becomes available for storing another incoming cell. Data path controller 30 also sends the cell's VOQ code to back pressure queue 37 and signals it to load the cell and its associated VOQ code into one of the two FIFO buffers 38 and 39 within back pressure queue 37. FIFO buffer 38 holds only TDM traffic cells while the FIFO buffer 39 holds only NTDM traffic cells. Data path controller 30 determines whether the cell is a part of TDM or NTDM traffic based on the cell's associated VOQ, and provides a TDM control bit telling back pressure queue 37 which of its two internal FIFO buffers 38 and 39 is to receive the cell.

Normally, when either of its internal FIFO buffers is not empty, back pressure queue 37 sequentially forwards the cells stored in those FIFO buffers, along with their associated VOQ numbers, to switch interface circuit 24 at a fixed rate, giving forwarding priority to TDM cells. Back pressure queue 37 pulses a LOAD signal to tell switch interface circuit 24 when a cell is being forwarded. Switch interface circuit 24 stores each arriving cell in a FIFO buffer associated with the cell's accompanying VOQ code. The fixed rate at which back pressure queue 37 forwards cells is normally higher than the rate at which cells from cell memory 32 enter FIFO buffers 38 and 39. Hence back pressure queue 37 usually forwards cells out of its FIFO buffers 38 and 39 as fast as they arrive, and those FIFO buffers normally do not fill up. However when the BP data from switch interface circuit 24 indicates that any of its internal FIFO buffers are full, back pressure queue 37 temporarily stops forwarding cells from both of its FIFO buffers.

Back pressure queue 37 periodically sends a single-bit back pressure signal BP2 for each VOQ to data path controller 30 indicating whether the data path controller may forward cells for that VOQ from cell memory 32 to back pressure queue 37. A VOQ data value accompanying the BP2 bit references the VOQ to which the BP2 signal currently applies. When its FIFO buffers 38 and 39 start to fill up, back pressure queue 37 uses the BP2 signal to tell data path controller 30 to stop sending it cells assigned to one or more VOQs associated with FIFO buffers in switch interface circuit 24 that are starting to full up.

Even though the BP2 signal may temporarily prevent data path controller 30 from forwarding cells from cell memory 32 assigned to a particular VOQ, queuing system 36 continues to generate the BLOCK_ID of cells of flows assigned to that VOQ at appropriate cell forwarding rates for those flows. Data path controller 30 continues to save each generated BLOCK_ID in the appropriate internal VOQ BLOCK_ID queue 40 or 41 until the BP2 back pressure signal indicates that it may resume forwarding cells assigned to that VOQ from cell memory 32. Data path controller 30 then resumes forwarding BLOCK_IDs from that VOQ's BLOCK_ID queue 40 or 41.

Queuing system 36 maintains counts of the number of cells stored in cell memory 32 that are assigned to each flow. Queuing system 36 notes the FIN conveyed in the header of the cell departing cell memory 32 when data path controller 30 pulses the READ signal and decrements the cell count for the flow to which that FIN is assigned. The counts enable queuing system 36 to determine when cells of various flows reside in cell memory 32 so that it can schedule them for departure. The counts also enable queuing system 36 to determine when to signal data path controller 30 to discard incoming cells assigned to each flow as the number of cells assigned to that flow stored in cell memory 32 approach allocated maximum limits.

Datapath controller 30 includes a separate counter 43 for each VOQ for counting the number of BLOCK_IDs currently residing in an associated one of VOQ queues 40 and

41. Data path controller also stores separate threshold data 43 for each VOQ as determined by input programming data. A counter 44 periodically generates each VOQ number in turn and sends it to queuing system 36. Data path controller 30 also sends a back pressure signal BP3 indicating whether the current cell count CNT for the VOQ identified by the VOQ output of counter 44 exceeds the threshold data T/H for that VOQ. Normally queuing system 36 attempts to allocate the traffic manager's forwarding bandwidth among all active flows so that cells of each flow are forwarded at or as near as possible to the maximum allowable forwarding rate for that flow. However when the BP3 signal indicates that the BLOCK_IC count in one of 40 or 41 associated with a particular VOQ has passed its threshold level, blocked, queuing system 36 sets the forwarding rates of all flows assigned to that VOQ to their minimum levels.

When back pressure causes cells of flows assigned to a given VOQ to stop departing cell memory 32 and back pressure queue 37, each such flow has an instantaneous forwarding rate of zero. But queuing system 36 continues to send BLOCK_IDs of the cells of each queue into BLOCK_ID queues 40 and 41 at least the minimum guaranteed forwarding rate for each flow assigned to that VOQ. Thus when actual cell forwarding for that VOQ resumes, cells of flows for that VOQ are forwarded at a higher than normal rate until the BLOCK_ID queue 40 or 41 for that VOQ is depleted. Hence despite the temporary halt in forwarding of cells of a given flow, the average cell forwarding rate for that VOQ remains at or above its minimum guaranteed rate.

Back Pressure Queue Circuit

Figure 4:
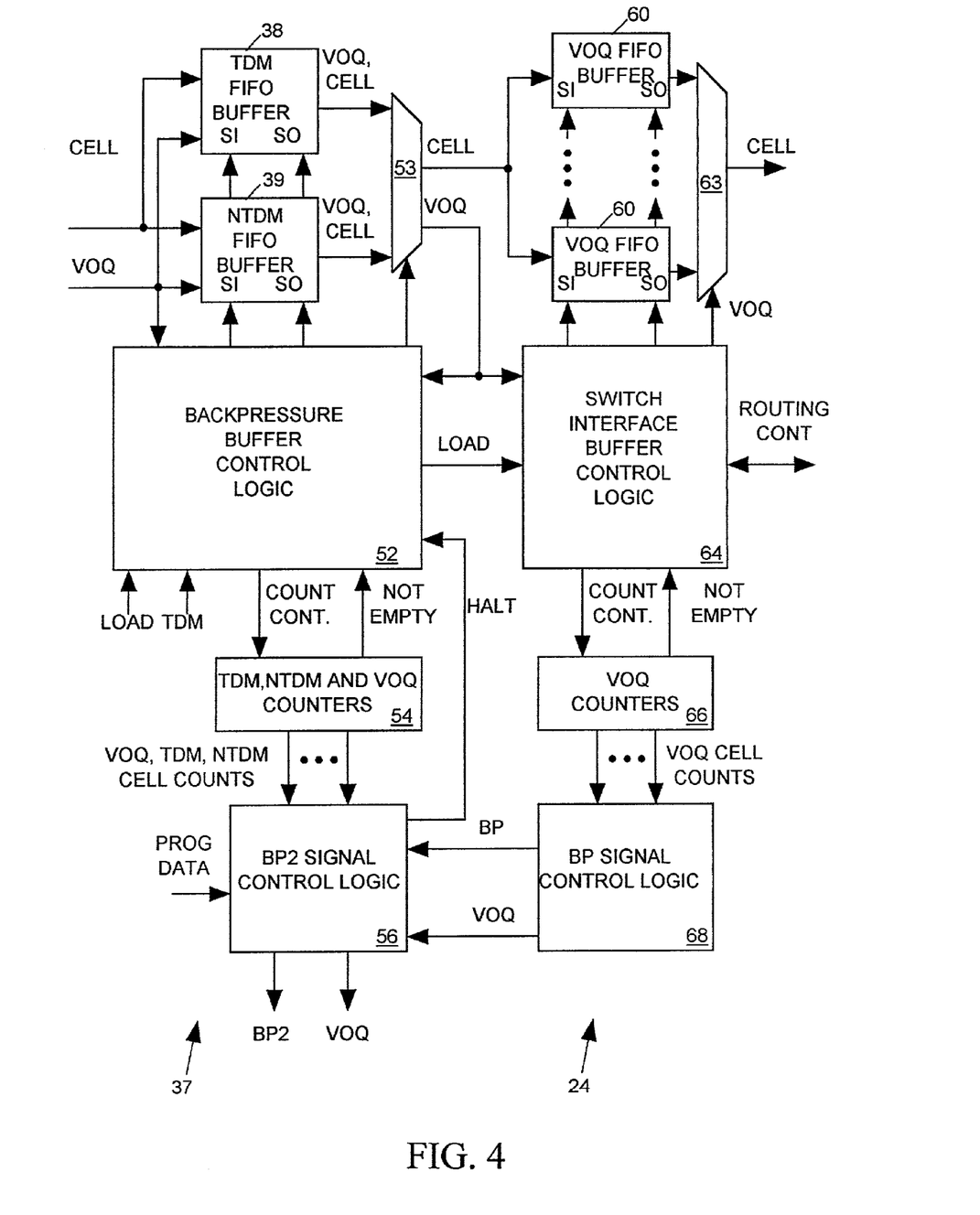
FIG. 4 illustrates the back pressure queue of FIG. 3 and the switch interface circuit of FIG. 2A in more detailed block diagram form.

FIG. 4 illustrates back pressure queue circuit 37 of FIG. 3 and switch interface circuit 24 of FIG. 2A in more detailed block diagram form. Back pressure queue circuit 37 includes TDM and NTDM FIFO buffers 38 and 39, a buffer control logic circuit 52, a multiplexer 53, a set of counters 54 and a BP2 back pressure signal control logic circuit 56. Buffer control logic 52 responds to each LOAD signal pulse and the TDM control data input from data path controller 30 of FIG. 3 by signaling one of FIFO buffers 38 and 39 to shift in a cell from cell memory 32 of FIG. 3. Two of counters 54 maintain counts of the number of cells in each of FIFO buffers 38 and 39. Control logic 52 tells each counter 54 to increment or decrement its count as cells enter and depart FIFO buffers 38 and 39. TDM and NTDM cell counters 54 signal control logic 52 when FIFO buffers 38 and 39 are not empty. There is also a separate counter 54 corresponding to each VOQ for keeping track of the number of cells in FIFO buffers 38 and 39 assigned to the corresponding VOQ. Control logic 52 checks the VOQs of the cells entering and departing FIFO buffers 38 and 39 and tells the appropriate VOQ counters 54 when to increment and decrement their counts.

The counts produced by all counters 54 are supplied to BP2 signal logic 56 which generates the BP2 and VOQ data telling data path controller 30 of FIG. 3 whether to forward cells of each VOQ from cell memory 32 to FIFO buffers 38 and 39. As discussed below, control logic circuit 56 decides whether to set each bit of the BP2 signal true or false based on the counts produced by counters 54 and on the BP back pressure data from switch interface circuit 24.

Switch interface circuit 24 includes a set of FIFO buffers 60, each corresponding to a separate VOQ, a multiplexer 63, a buffer control logic circuit 64, a set counters 66 and logic circuit 68 for generating the back pressure data BP supplied to BP2 signal control logic 56. Buffer control logic 64 responds to each LOAD signal pulse from buffer control logic 53 by signaling one of FIFO buffers 60 or 61 to load the cell arriving from multiplexer 53. The VOQ code from multiplexer 53 indicates which FIFO buffer 60 is to store the cell. Each counters 66 maintains a separate count of the number of cells currently stored in a corresponding one of VOQ FIFO buffers 60. The counters 66 signal buffer control logic 64 when any of buffers is not empty. Buffer control logic 64 communicates with routing control circuit 18 of FIG. 1 to obtain a signal path to an output ports 15 and routes cells out of FIFO buffers 60 and 61 via multiplexer 63 and crosspoint switch 16 to the appropriate output ports. Buffer control logic 64 signals counters 66 when they should increment or decrement their counts.

The VOQ cell counts maintained by counters 66 are supplied to BP signal control logic 68. BP signal control logic circuit 68 periodically supplies each possible VOQ value to BP2 signal control logic circuit 56. The BP data accompanying each VOQ value indicates whether 0%, 25%, 50% or 100% of the capacity of a corresponding VOQ FIFO buffer 60 is unused.

BP2 signal control logic 56 also periodically supplies each possible VOQ value to data path controller 30 of FIG. 3 along with the single-bit BP2 code indicating whether cells assigned to the VOQ may be forwarded from cell memory 32 to buffers 38 and 39.

When the BP data from BP signal control logic circuit 68 indicates than any of VOQ FIFO buffers 60 is full, BP2 signal control logic circuit 56 signal back pressure buffer control logic circuit 52 to stop forwarding cells from FIFO buffers 38 and 39.

When the TDM cell count data output of counters 54 indicates that TDM FIFO buffer 38 is full, BP2 signal control logic circuit 65 tells data path controller 30 to stop forwarding cells assigned to TDM VOQs from the cell memory to TDM FIFO buffer 38.

When the NTDM cell count data output of counters 54 indicates that NTDM FIFO buffer 38 is full, BP2 signal control logic circuit 65 tells data path controller 30 to stop forwarding cells assigned to NTDM VOQs from the cell memory to NTDM FIFO buffer 38.

When the data from BP signal control logic 68 indicates that less than all of the cell storage capacity of any FIFO buffer 60 corresponding to a VOQ is currently unused, and the cell count output of counters 54 for that VOQ is above a threshold level, BP2 signal control logic circuit 56 sets the BP2 data for that VOQ to signal data path controller 30 to stop forwarding cells assigned to that VOQ to FIFO buffers 38 and 39. Input programming data set separate threshold levels for each VOQ and the threshold level for a given VOW is a function of the value of the BP data for that VOQ.

Thus, for example, assume that the BP data value for a particular VOQ FIFO buffer 60 changes from 11 to 10, indicating that the unused storage capacity has decreased from somewhere above 50% to somewhere between 25% and 50%, When that happens, BP2 signal control logic circuit 56 lowers the threshold level at which the count output of counters 54 will trigger a halt in the flow of cells of that VOQ into FIFO buffer 38 or 39. When the BP signal thereafter drops to 01, indicating that the spare capacity of the FIFO buffer 60 has further declined below 25%, BP2 signal control logic again lowers the threshold level. Thus as the spare capacity of a FIFO buffer 60 associated with a particular VOQ declines, and as the number of cells stored in FIFO buffers 38 an 39 that are assigned to that VOQ increases, BP2 signal control logic circuit 56 becomes increasingly likely to shut of the flow of cells assigned to that VOQ out of cell memory 32.

Referring to FIGS. 1–4, when an output port 15 to which an input port 14 wants to forward cells is blocked is busy receiving cells from other input ports, the VOQ FIFO buffer 60 within switch interface circuit 24 of that input port 14 begins to fill up. As the spare capacity of that FIFO buffer 60 declines, BP signal control logic circuit 68 decreases the value of the 2-bit BP data for the VOQ associated with that FIFO buffer 60. This causes BP2 signal control logic circuit 56 to lower the cell count threshold for that VOQ. When the cell count for that VOQ crosses the threshold, BP2 signal control logic circuit 56 signals data path controller to stop forwarding cells from cell memory 32 that are assigned to that VOQ. In doing so, data path controller 30 stops reading BLOCK_IDs out of the BLOCK_ID queue 40 or 41 associated with that VOQ. For a time queuing system 36 may continue to append more BLOCK_IDs to the queue 40 or 41 associated with that VOQ at a rate higher than the sum of the minimum guaranteed forwarding rates of flows assigned to that VOQ. However when the number of BLOCK_IDs stored in the queue 40 or 41 associated with that VOQ rises above the threshold level set by threshold data 43 for that VOQ, data path controller 30 signal queuing system 30 to reduce the forwarding rate for all flows assigned to that VOQ to their minimum guaranteed levels.

Should the blockage of the output port associated with the back pressured VOQ persist long enough that incoming cells of flows assigned to that VOQ begin to fill up the portions of cell memory 32 assigned to those flow, queuing system 36 begins to signal data path controller 20 to randomly discard incoming cells belonging to those flows.

When the output port 15 is no longer blocked and is able to accept cells from the VOQ FIFO buffer 60 associated with that output port, The unused storage capacity of that FIFO buffer begins to increase. The value of the BP signal for that VOQ increase and BP2 signal controller 56 raises the count threshold level for that VOQ. When the cell count output of counter 54 for that VOQ falls below the threshold, BP2 signal control logic 56 signals data path controller 30 to resume forwarding cells ascertained to that VOQ from cell memory 32 to back pressure queue 37. The number of BLOCK_IDs in the BLOCK_ID queue 40 or 41 for that VOQ declines, and at some point falls below the threshold level for that VOQ set by threshold data 43. Data path controller 30 then signals queuing system 36 that it may now increase the cell forwarding rates for flows assigned to that VOQ above their minimum guaranteed levels. And as the number of cells stored in cell memory 31 that are assigned to those flows declines below their threshold levels, queuing system 36 stops signaling data path controller 30 to discard incoming cells assigned to those flows.

A traffic manager for a typical prior art input port for a network switch reads cells out of a cell memory at specified rates and then stores them in FIFO buffers until they can be forwarded to output ports. The FIFO buffers accumulate cells during periods of downstream blockage so that the average cell forwarding rate is not affected by short term blocking at switch output ports. However to maintain average cell flow rates despite relatively long term output port blocking, the FIFO buffers have to be relatively large so that they don't fill up to the point where the traffic manager has to stop reading cells out of the cell memory.

Since BLOCK_ID queues 40 and 41 accumulate BLOCK_IDs of cells to be read out of cell memory 32 after the data path controller 30 is able to resume reading cells of cell memory 32, long-term average flow rates are not affected by when the data path controller it stops reading cells out of cell memory 32 in response to back pressure.

Hence traffic manager 22 of the present invention does not require particularly large FIFO buffers 38, 39 and 60 for storing cells read out of cell memory 32 in order maintain minimum guaranteed average forwarding rates. Since a BLOCK_ID pointing to a cell in memory 32 is much smaller than the cell itself, the memory BLOCK_ID queues 40 and 41 need to accumulate a large number of BLOCK_IDs is much smaller (and less expensive) than the FIFO buffer memory needed to accumulated a similar number of the cells to which they point.

Also when free list 33 and BLOCK_ID queues 40 and 41 are implemented as linked lists in the same memory, the BLOCK_ID queues 40 and 41 do not require any additional memory space. Free list 33 must be able to store the BLOCK_ID of every memory block of cell memory 32 when cell memory 32 is empty. Likewise, queues 40 and 41 collectively must be able to store the BLOCK_ID of every one memory block of cell memory 32 when the cell memory is full. Whenever cell is written into cell memory 32, data path controller pops the BLOCK_ID of the cell off of free list 33. The memory location used to store that BLOCK_ID then becomes available to queues 40 and 41 for when the BLOCK_ID of that cell is added to queue 40 or 41. Whenever a cell is read out of cell memory 32, the BLOCK_ID of that cell is popped off of one of queues 40 and 41 and pushed onto free list 33. The memory storage location queues 40 and 41 used to store that BLOCK_ID is immediately available to free list 33 for store that same BLOCK_ID. Thus the BLOCK_ID queues 41 and 42 not only permit a reduction in the size of FIFO buffer memory resource, the BLOCK_ID queues themselves require no additional memory resources when they share them with free list 33.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for receiving and storing incoming cells derived from data transmissions conveyed on a network, and for then forwarding the cells elsewhere in the network, the apparatus comprising:

a cell memory for sequentially receiving and storing the incoming cells in separate memory blocks, each of the memory blocks being identified by a unique identification number (BLOCK_ID), and for thereafter reading out a cell stored in any one of the memory blocks when its BLOCK_ID is transmitted to the cell memory;

queuing means (36) for sequentially generating BLOCK_IDs of memory blocks storing cells to be read out of the cell memory; and memory control means (30) for maintaining a BLOCK_ID queue, for adding BLOCK_IDs generated by the queuing means to the BLOCK_ID queue in an order in which they a generated by the queuing means, and for removing BLOCK_IDs from the BLOCK_ID queue and transmitting them to the cell memory in an order in which the BLOCK_IDs were added to the BLOCK_ID queue such that cell memory reads out the cells stored in the memory blocks identified by the BLOCK_IDs transmitted by the memory control means.

2. The apparatus in accordance with claim 1 further comprising:
　　first buffer means (37) for storing cells read out of the cell memory, and for thereafter reading out and forwarding cells it has stored.

3. The apparatus in accordance with claim 2
　　wherein the first buffer means produces and sends first back pressure data to the memory control means indicating whether a number of cells stored in the first buffer means is above a first threshold level,
　　wherein the memory control means successively removes BLOCK_IDs from the BLOCK_ID queue and transmits them to the cell memory whenever the BLOCK_ID queue contains at least one BLOCK_ID and the first back pressure data indicates the number of cells stored in the first FIFO buffer means is above the first threshold level, and
　　wherein the memory control means refrains from removing BLOCK_IDs from the BLOCK_ID queue and transmitting them to the cell memory whenever the first back pressure data indicates that the number of cells stored in the first buffer means is below the first threshold level.

4. The apparatus in accordance with claim 3 further comprising
　　second buffer means (24) for storing cells read out of the first buffer means and for thereafter forwarding each cell it stores elsewhere in the network.

5. The apparatus in accordance with claim 4
　　wherein the second buffer means generates second back pressure data indicating an amount of unoccupied storage capacity of the second buffer means, and
　　wherein the first buffer means sets the first threshold level in response to the second back pressure data.

6. A method for receiving and storing cells derived from data transmissions conveyed on a network, and for then forwarding the cells elsewhere in the network, the method comprising the steps of;
　　a. sequentially receiving and writing the cells into separate blocks of a cell memory, wherein each memory block is identified by a unique identification number (BLOCK_ID);
　　b. generating a sequence of BLOCK_IDs of memory blocks currently storing cells;
　　c. adding each generated BLOCK_ID to a BLOCK_ID queue,
　　d. successively removing each BLOCK_ID from the BLOCK_ID queue in an order in which BLOCK_IDs were added to the BLOCK_ID queue whenever the BLOCK_ID queue contains BLOCK_IDs and first back pressure data indicates that BLOCK_IDs may be removed from the BLOCK_ID queue, and refraining from removing BLOCK_IDs from the BLOCK_ID queue when the first back pressure data indicates that BLOCK_IDs may not be removed from the BLOCK_ID queue,
　　e. reading a cell out of the cell memory whenever the BLOCK_ID of the memory block in which it is stored is removed from the BLOCK_ID queue at step d.

7. The method in accordance with claim 6 further comprising the steps of.
　　f. writing cells read out of the cell memory into first buffer means for storing and reading out cells,
　　g. reading the cells out of the first buffer means, and
　　h. setting the first back pressure data to indicate that BLOCK_IDs may not be removed from the BLOCK_ID queue whenever a number of cells stored in the first buffer means rises above a threshold level, and setting the first back pressure data to indicate that BLOCK_IDs may be removed from the BLOCK_ID queue whenever the number of cells stored in the first buffer means falls below the threshold level.

8. The method in accordance with claim 7 further comprising the steps of:
　　i. storing cells read out of the first buffer means in second buffer means for storing and reading out cells;
　　j. reading cells out of the second buffer means and forwarding them elsewhere in the network;
　　k. generating a second back pressure data indicating an amount of unoccupied storage capacity of the second buffer means; and
　　l. setting the threshold level in response to the value of the code conveyed in the second back pressure data.

9. A method for receiving and storing cells derived from data transmissions conveyed on a network, and for then forwarding the cells elsewhere in the network, wherein each cell is identified as belonging to one of a plurality of flows, wherein each flow has defined minimum and maximum forwarding rates, and wherein each flow is assigned to one of a plurality of virtual output queues (VOQs), the method comprising the steps of;
　　a. sequentially receiving and writing the cells into separate blocks of a cell memory, wherein each memory block is identified by a unique identification number (BLOCK_ID);
　　b. for each flow for which cells identified as belonging thereto are currently stored in the cell memory, generating BLOCK_IDs of memory blocks storing such cells at a rate bounded by that flow's defined minimum and maximum forwarding rates;
　　c. establishing a separate BLOCK_ID queue corresponding to each of the VOQs,
　　d. adding each BLOCK_ID generated at step b to a BLOCK_ID queue corresponding to the VOQ to which is assigned the flow of a cell stored in a memory block identified by the generated BLOCK_ID,
　　e. for each VOQ providing corresponding first back pressure data indicating whether BLOCK_IDs may or may not be removed from the BLOCK_ID queue corresponding to the VOQ;
　　f. for each VOQ, whenever the corresponding first back pressure data indicates BLOCK_IDs may be removed from the corresponding BLOCK_ID queue, successively removing BLOCK_IDs from the corresponding BLOCK_ID queue in an order which they were added to the BLOCK_ID queue;
　　g. for each VOQ, whenever the corresponding first back pressure data indicates BLOCK_IDs may be not be removed from the corresponding BLOCK_ID queue, refraining from removing BLOCK_IDs from the corresponding BLOCK_ID queue; and
　　h. reading a cell out of the cell memory whenever the BLOCK_ID of the memory block in which the cell is stored is removed from any BLOCK_ID queue at step f.

10. The method in accordance with claim 9 further comprising the steps of:
　　i. storing each cell read out of the cell memory in first buffer means,
　　j. reading the cells out of the first buffer means, and k, for each VOQ, generating the corresponding first back pressure data,
　　　　wherein the first back pressure data indicates that BLOCK_IDs may be removed from the BLOCK_ID queue corresponding to the VOQ when a number of cells of flows assigned to that VOQ stored in the first buffer means is below a first threshold level, and wherein the first back pressure data indicates that BLOCK_IDs may no be removed from the BLOCK_ID queue corresponding to the VOQ when a number of cells of flows assigned to that VOQ stored in the first butter means is above the first threshold level.

11. The method in accordance with claim 10 further comprising the steps of:
 l. storing cells read out of the first buffer means in second buffer means;
 m. reading cells out of the second buffer means and forwarding them elsewhere in said network;
 n. for each VOQ, generating corresponding second back pressure data indicating an amount of unoccupied storage capacity of the second buffer means, and
 o. adjusting the first threshold level corresponding to each VOQ in response to the second back pressure data corresponding to that VOQ.

12. The method in accordance with claim 11 further comprising the step of:
 p. for each VOQ, generating a corresponding third back pressure data indicating whether a number of BLOCK_IDs residing in the corresponding BLOCK_ID queue is above or below a second threshold level, wherein a rate at which BLOCK_IDs of cells identified as belonging to each flow assigned to the VOQ are generated at step g is set to the flow's assigned minimum forwarding rate when the corresponding third back pressure data indicates that the number of BLOCK_IDs residing in the corresponding BLOCK_ID queue is above the second threshold level, and wherein the rate at which BLOCK_IDs of cells identified as belonging to each flow assigned to the VOQ are generated at step g is set higher than the flow's assigned minimum forwarding rate when the corresponding third back pressure data indicates that the number of BLOCK_IDs residing in the corresponding $BLOCK_{13}$ ID queue is below the second threshold level.

13. The method in accordance with claim 9 further comprising the step of:
 i. for each VOQ, generating a corresponding third back pressure data indicating whether a number of BLOCK_IDs residing in the corresponding BLOCK_ID queue is above or below a second threshold levels, wherein a rate at which BLOCK_IDs of cells identified as belonging to each flow assigned to the VOQ are generated at step g is set to the flow's assigned minimum forwarding rate when the corresponding third back pressure data indicates that the number of BLOCK_IDs residing in the corresponding BLOCK_ID queue is above the second threshold level, and wherein the rate at which BLOCK_IDs of cells identified as belonging to each flow assigned to the VOQ are generated at step g is set higher than the flow's assigned minimum forwarding rate when the corresponding third back pressure data indicates that the number of BLOCK_IDs residing in the corresponding BLOCK_ID queue is below the second threshold level.

* * * * *